Figure 1:
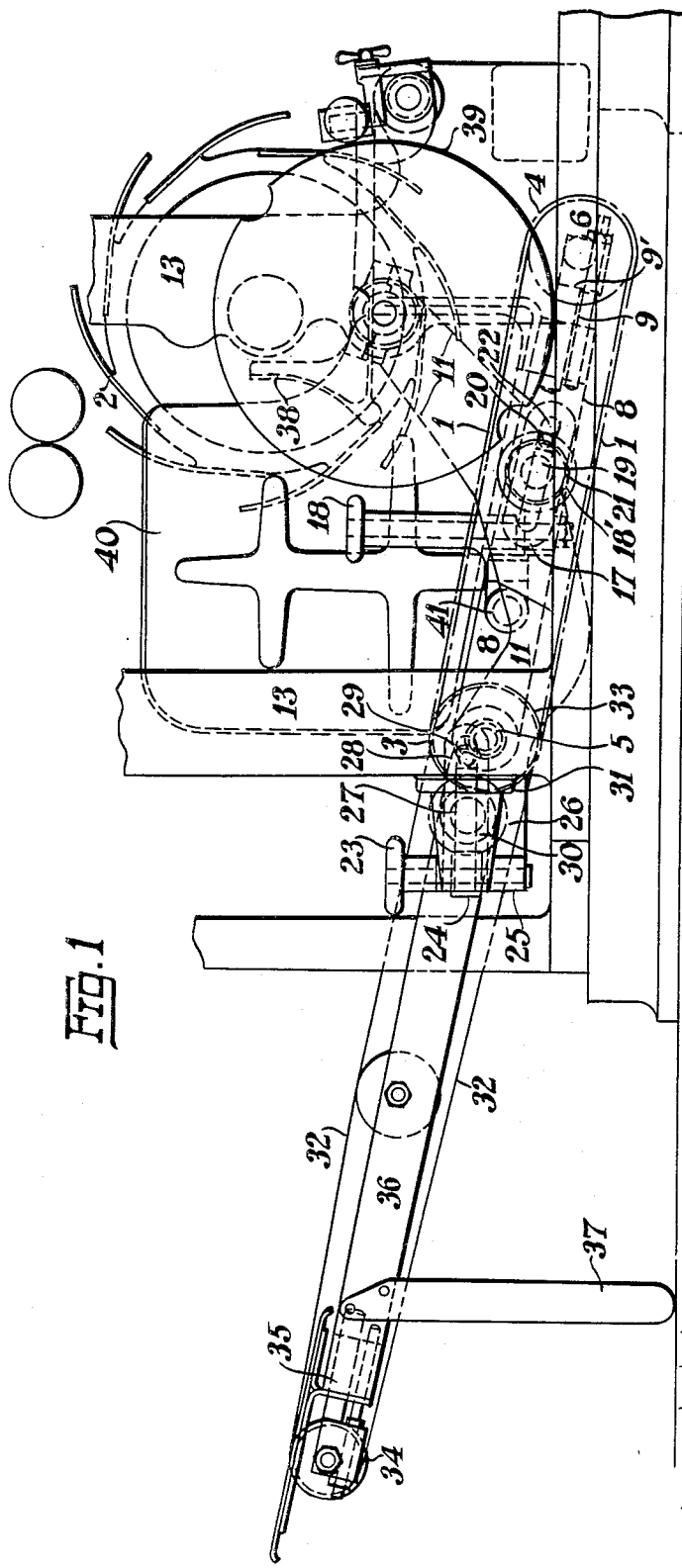

April 17, 1934.  C. G. QUICK ET AL  1,955,514
DELIVERY MECHANISM FOR PRINTING MACHINES
Filed June 25, 1932   3 Sheets-Sheet 1

INVENTORS
Cecil G. Quick
Charles W. Marshall
Donald A. Ball
William A. Whitehead
by John R. Towlin
ATT'Y.

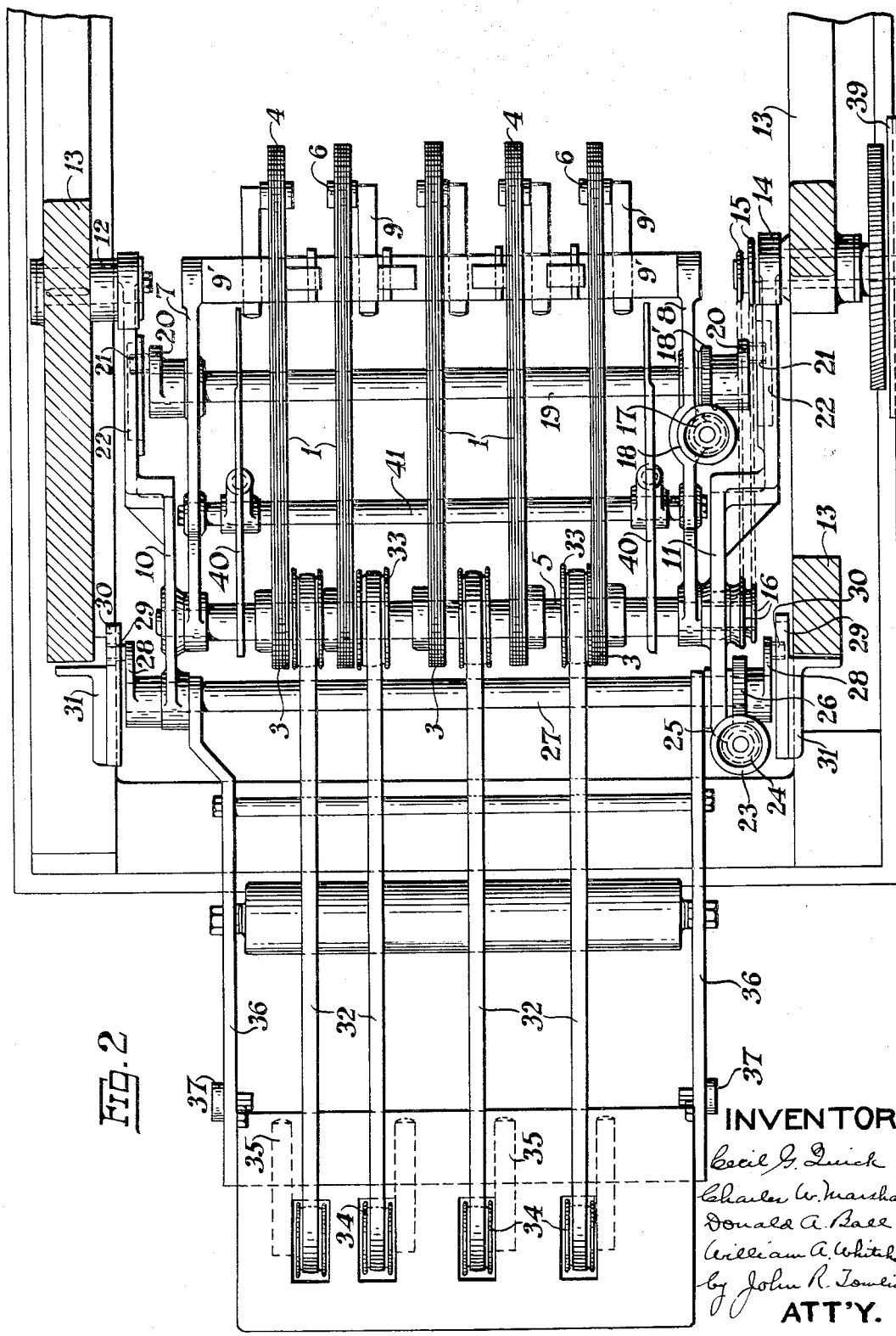

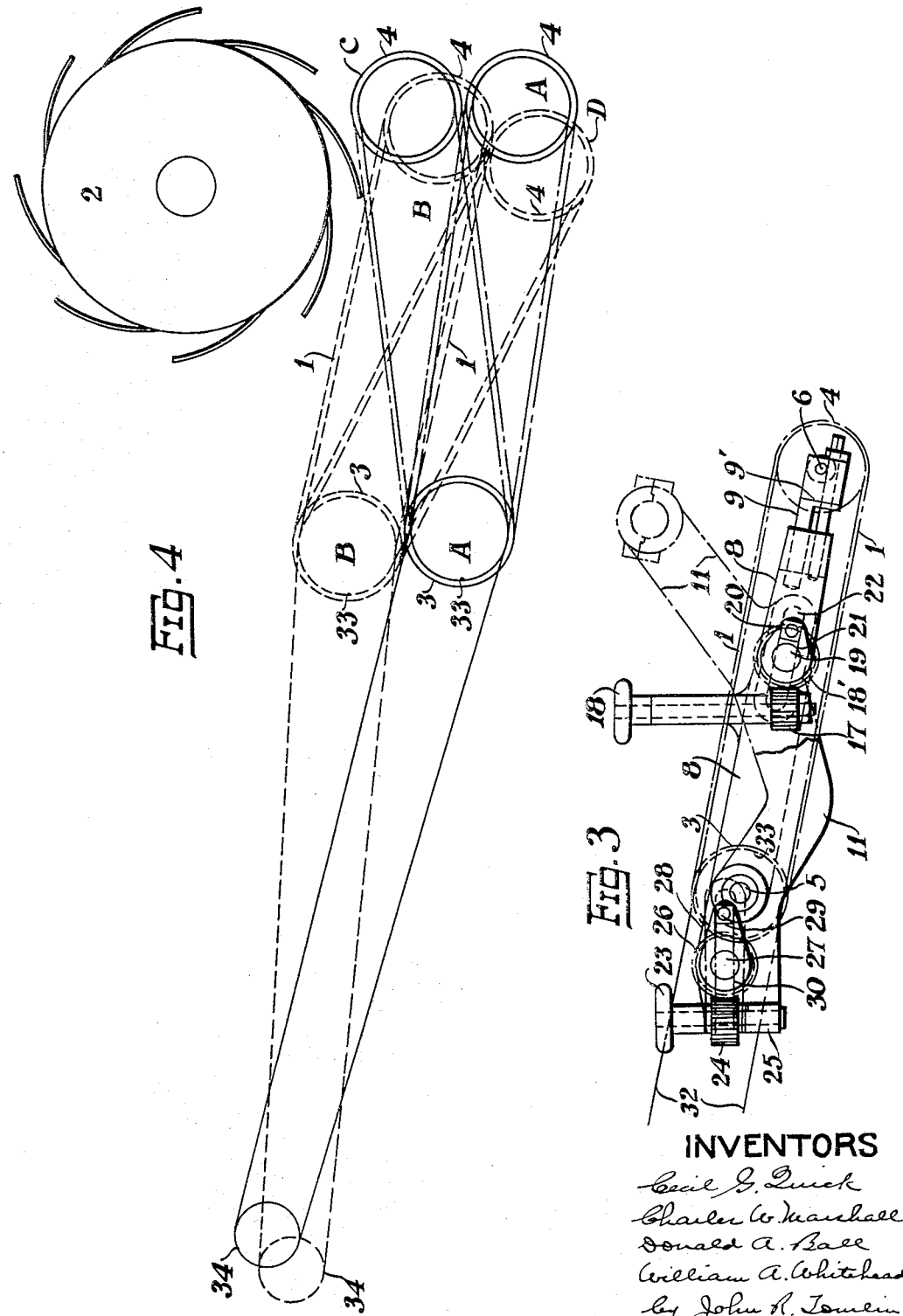

Patented Apr. 17, 1934

1,955,514

UNITED STATES PATENT OFFICE 1,955,514

DELIVERY MECHANISM FOR PRINTING MACHINES

Cecil George Quick, Eltham, London, Charles William Marshall, Brixton, London, Donald Arthur Ball, Beckenham, and William Arnold Whitehead, Southall, England, assignors to Irving Trust Company, Receiver in Equity for R. Hoe & Co., Inc., New York, N. Y., a corporation of New York Application June 25, 1932, Serial No. 619,240 In Great Britain July 14, 1931

12 Claims. (Cl. 271—75)

This invention relates to delivery mechanism and more particularly to the conveying mechanism of rotary printing machines, and is an improvement over the device shown in a pending application Serial No. 488,394, filed October 13th 1930 for improvements in Delivery mechanism for use in printing machines, wherein is provided conveyor or mechanism to which a rotatable fly delivery device delivers the products, with means for adjusting the relative position of the conveyor device and fly to enable the conveyor device and fly to be positioned most efficiently for different thicknesses of product. In the form of construction described in the said application, the conveyor device was carried on a frame which was pivotally mounted at one end to enable the adjustment to be effected.

It has been found that this arrangement while satisfactory within a normal range of thickness, possesses the disadvantage that for certain thicknesses of product the most efficient position of the frame would be such that the angle of the conveyor would tend to allow copies to slide relatively to the conveyor device in a direction opposite to that in which they are to be conveyed; i. e. the conveyor device would in such a position of adjustment not convey the copies satisfactorily.

The main object of the present invention is to provide an arrangement which will enable this disadvantage to be overcome.

According to the present invention the conveyor device is mounted to have bodily translational movement of adjustment and preferably an angular adjustment. The angular adjustment is preferably such that the conveyor can be given a slope either upwardly or downwardly with respect to the direction of movement of the conveyor to deliver the copies.

The invention is illustrated in the accompanying drawings in which Figure 1 is a side elevation, Figure 2 a plan, Figure 3 a detail view and Figure 4 a diagrammatic view illustrating the range of adjustment of the machine shown in Figures 1–3.

1 indicates conveyor chains on which a fly delivery (one fly being indicated at 2) lays copies delivered to the fly from the printing machine. The chains pass around sprocket wheels 3, 4 mounted on a shaft 5 and stub shafts 6 respectively the shafts 6 being supported from frame members 7, 8 through the intermediary of adjusting frames 9 carried by a cross frame member 9' and the shaft 5 being supported in frame members 10, 11 and also forming a pivotal mounting for the frame members 7, 8.

The frame member 10 is pivotally mounted on a support 12 secured to the main frame 13 of the machine and the frame member 11 is pivotally mounted on a shaft 14 which is rotatably mounted in the main frame, this shaft 14 being provided with sprocket wheels 15 which transmit drive to sprocket wheels 16 on the shaft 5 which is rotated thereby to effect movement of the conveyor chains 1. The rate at which the chains are driven can be varied by selection of the sprocket wheels 15 and 16.

The frame comprised of the frame members 7, 8 can be rocked about its pivotal mounting on the shaft 5 by a worm 17 rotatably mounted in a bracket on the frame member 8 and having an actuating hand wheel 18: the worm is in mesh with a worm wheel 18', fast on a shaft 19 extending from one frame member 7 to the other frame member 8 and having at each end a crank 20 having a pin on which is mounted a block 21 which enters a recess 22 in the frame members 10, 11 respectively.

The frame comprised of the frame members 10, 11, can be rocked about its pivotal mounting on the shaft 14 and the support 12 by a worm and worm wheel mechanism similar to that described for the frame members, a handwheel 23 being as before, fast with a worm 24 mounted in a bracket 25 secured to the frame member 11 and in mesh with a worm wheel 26 fast on a shaft 27 having at each end a crank 28 provided with a pin on which is mounted a block 29. The blocks 29 extend into recesses 30 formed in brackets 31 secured to the main frame 13 of the machine.

It will be seen that to impart a bodily translational movement of the conveyor towards or away from the fly, both handwheels 18 and 23 are rotated, whereby the cranks on the shafts 19, 27 will cause their respective frames considered individually to rock about their pivotal mountings with however, a resultant bodily movement of translation. If it is desired to impart an angular movement of adjustment of the conveyor this can be effected by rotating one or other of the handwheels 18, 23 depending upon the direction of the adjustment required; i. e. whether the slope is required to be an upward one or a downward one with respect to the direction of the upper or delivery side of the chain. Referring to Figure 4 assuming that the position indicated at A to be the normal position, by rotating both handwheels, the conveyor can be raised to the position indicated at B by rotating the handwheel 18 the conveyor can be angularly adjusted from position A to the position indicated at C, and by rotating the handwheel 23 the conveyor can be angularly adjusted from position B to the position indicated at D. It will be obvious that the conveyor can be moved to intermediate positions.

The copies pass from the chains 1 to endless belts 32 which pass at one end over pulleys 33 secured to the shaft 5 and at the other end around pulleys 34 carried through the intermediary of adjusting devices 35 from a frame comprising frame members 36 which are pivotally mounted on the shaft 27, the frame being supported by legs 37 whose lower ends are rounded to enable them to roll to accommodate themselves to varying angles of the frame members 36 when the conveyor frames are translated bodily or when the frame members 10, 11 are angularly adjusted about the shaft 14 and support 12.

It will be seen that with the arrangement of the parts shown, the conveyor mechanism can be erected to form a unit which can quickly be placed in position, the shaft 14 and support 12 being readily positioned on the main frame to constitute the pivotal mountings for the frame members 10, 11 and the brackets 31 secured in position to receive the blocks 29 on the cranks 28.

As in the parent application "count" copies are ejected from the fly by a kicker 38 actuated by a disc 39 and the screws referred to in the parent specification and indicated at 40 are mounted on cross bar 41 secured to the frame member and acting as a cross-tie therefor.

What we claim is:

1. In a delivery mechanism for printing machines, the combination of a fly and like delivery device, a conveyor to which the delivery device delivers products, the conveyor being constructed and arranged for translational and angular movement relative to the delivery device.

2. In a delivery mechanism for printing machines, the combination of a fly and like delivery device, a conveyor to which the delivery device delivers products, and supporting means for the conveyor constructed and arranged to permit translational and angular movement of the conveyor relative to the said delivery device.

3. In delivery mechanism for printing machines, the combination of fly and the like delivery devices, a conveyor device to which delivery devices deliver products, a frame supporting said conveyor, said frame being pivotally mounted on two movable axial supports, and means for displacing the said axial supports for angular and bodily displacement.

4. In delivery mechanism for printing machines, the combination of fly and the like delivery devices, a conveyor device to which delivery devices deliver products, a frame for supporting said conveyor, said frame being pivotally mounted on two adjustable axial supports, whereby said frame may be translated bodily by displacement of said axial supports and optionally moved angularly about either of the axial supports.

5. A delivery mechanism comprising a pair of pivotally mounted frames which conjointly form a support for a conveyor device and adjusting mechanism for each frame, whereby both frames can be rocked about their pivotal mountings to effect optionally a bodily translational movement of the conveyor device and one frame rocked about its pivotal mounting to effect an angular movement of the conveyor device.

6. A delivery mechanism comprising a pair of frames, one pivoted to the other, which conjointly form a support for a conveyor device and adjusting mechanism for each frame, whereby both frames can be rocked about their pivotal mountings to effect optionally a bodily translational movement of the conveyor device and one frame rocked about its pivotal mounting to effect an angular movement of the conveyor device.

7. A delivery mechanism comprising a pair of frames, one pivoted to the other, which conjointly form a support for a conveyor device and adjusting mechanism for each frame whereby both frames can be rocked about their pivotal mountings to effect optionally a bodily translational movement of the conveyor device and one frame rocked about its pivotal mounting to effect an angular movement of the conveyor device, each of said frames having separate adjusting mechanism coactable with the adjusting mechanism of the other frame.

8. A delivery mechanism comprising a pair of frames, one pivoted to the other, which conjointly form a support for a conveyor device and adjusting mechanism for each frame whereby both frames can be rocked about their pivotal mountings to effect optionally a bodily translational movement of the conveyor device and one frame rocked about its pivotal mounting to effect an angular movement of the conveyor device, said mechanism having crank members operable by self-locking gear means.

9. A delivery mechanism as claimed in claim 8 in which the adjusting mechanisms comprise crank members which are operable by self-locking gear means.

10. A delivery mechanism comprising a frame provided with a shaft having guides for one point in an endless flexible conveyor device, a second frame pivotally mounted on the shaft and provided with guides for another point in the conveyor device, a support on which the first frame is pivotally mounted, a worm and worm wheel carried by the second frame and in operative connection with cranked members co-operating with the other frame, and a worm and worm wheel carried by the first frame and in operative connection with cranked members co-operating with relatively fixed members.

11. In a delivery mechanism for printing machines, the combination of a fly and like delivery device, a conveyor to which the delivery device delivers products, supporting means for the conveyor constructed and arranged to permit translational and angular movement of the conveyor relative to the delivery device, and means for imparting translational and angular movement to the conveyor.

12. In a delivery mechanism for printing machines, the combination of a fly and like delivery device, a conveyor to which the delivery device delivers products, supporting means for the conveyor constructed and arranged to permit translational and angular movement of the conveyor relative to the delivery device, and means operably supported by the conveyor supporting means for imparting translational and angular movement to the conveyor.

CECIL GEORGE QUICK.
CHARLES WILLIAM MARSHALL.
DONALD ARTHUR BALL.
WILLIAM ARNOLD WHITEHEAD.